Nov. 4, 1969      J. H. WINDHAM, JR      3,476,433
CLOTHES AND LUGGAGE CARRIER FOR VEHICLES
Filed June 19, 1967      2 Sheets-Sheet 1

INVENTOR
JAMES H. WINDHAM, JR.

BY *Rupert J. Brady*
ATTORNEY

Nov. 4, 1969  J. H. WINDHAM, JR  3,476,433
CLOTHES AND LUGGAGE CARRIER FOR VEHICLES
Filed June 19, 1967  2 Sheets-Sheet 2
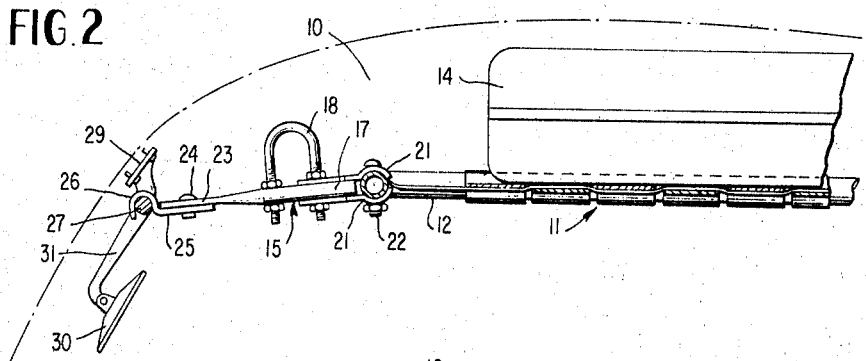
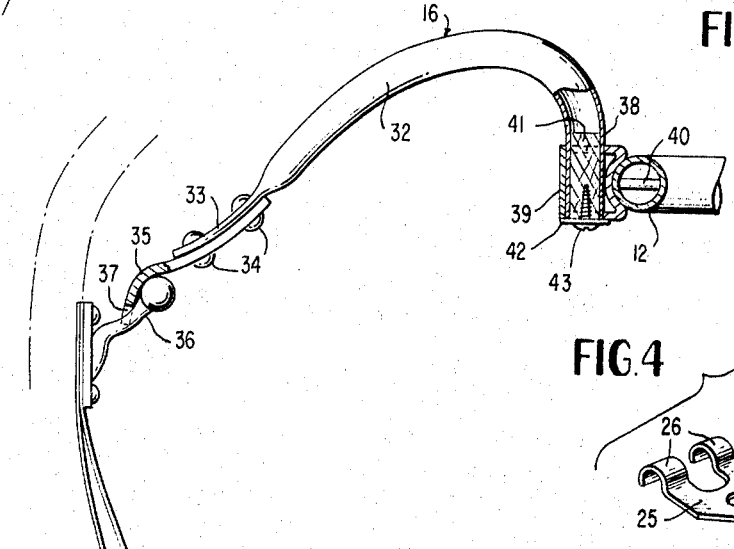
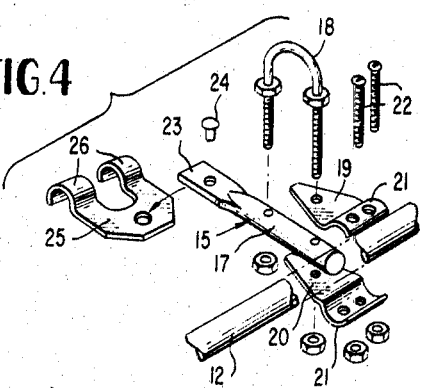
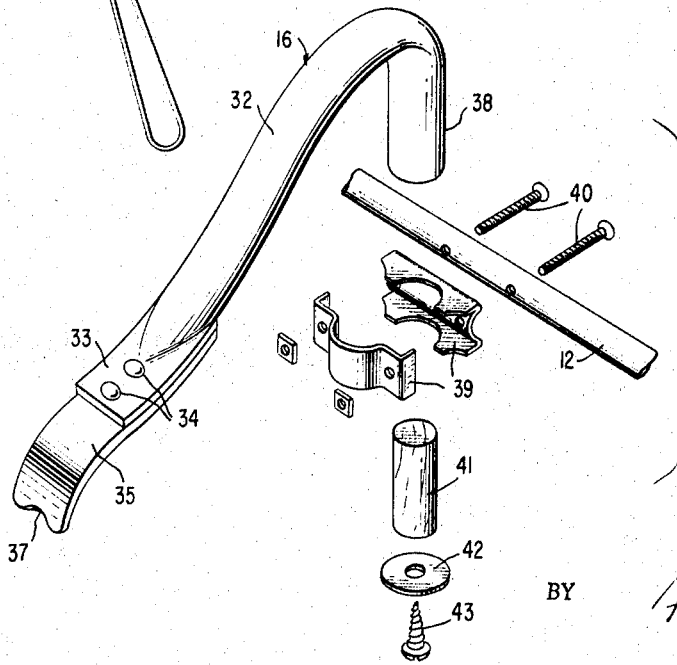
INVENTOR
JAMES H. WINDHAM, JR.
BY Rupert J. Brady
ATTORNEY

United States Patent Office 3,476,433
Patented Nov. 4, 1969

3,476,433
CLOTHES AND LUGGAGE CARRIER FOR VEHICLES
James H. Windham, Jr., 1908 3rd Ave. N., Columbus, Miss. 39701
Filed June 19, 1967, Ser. No. 647,083
Int. Cl. B60r 7/04
U.S. Cl. 296—24                                2 Claims

ABSTRACT OF THE DISCLOSURE

A clothes and luggage carrier particularly adaptable to the well-known Volkswagen and utilizing the generous head clearance in the sedan which would be otherwise wasted. The carrier is sturdy and compact and attached readily to existing hardware in the vehicle without any alteration of the vehicle structure.

BACKGROUND OF THE INVENTION

There is a definite need for increased clothes and luggage storage space in the popular Volkswagen sedan. Exterior roof racks, bumper racks and the like are cumbersome, frequently awkward to install, tend to mar the finish of the automobile, and are somewhat dangerous. Interior article supports for automobiles generally have not been adequate and have required altering the vehicle hardware or structure, drilling holes and the like, and these interior supports are frequently bulky and unsturdy. In accordance with the invention, the above prior art deficiencies are overcome and a highly convenient, practical and economical interior carrier is provided.

SUMMARY OF THE INVENTION

The invention carrier utilizes existing head space in the sedan and includes a generally flat carrier frame having preferably a support surface of webbing. The frame carries adjustable supporting extensions which are readily engageable with existing hardware in all models of the Volkswagen sedan to firmly support the carrier in the level use position. The carrier is easily demountable for compact storage.

BRIEF DESCRIPTION OF THE DRAWINGS

FIGURE 2 is an enlarged fragmentary longitudinal vertical section taken on line 2—2 of FIGURE 1;

FIGURE 3 is an enlarged fragmentary vertical section taken on line 3—3 of FIGURE 1;

FIGURE 4 is an exploded perspective view of a front support means;

FIGURE 5 is a similar view of a side support means; and

DESCRIPTION OF THE PREFERRED EMBODIMENTS

Figure 6:
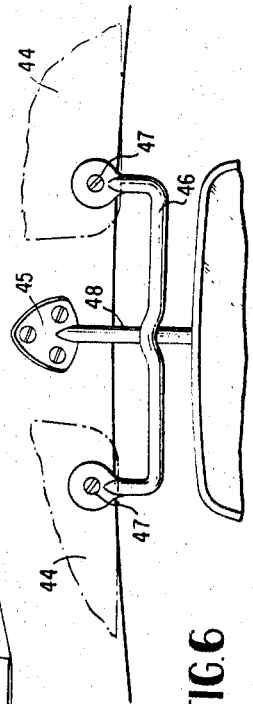
FIGURE 6 is a fragmentary elevational view of a modified mirror and sun visor structure in late model sedans, and showing an adapter bar used in such sedans to engage the front support means of the carrier.

Referring to the drawings, wherein like numerals designate like parts, attention is directed first to FIGURES 1 through 5. These figures show the embodiment of the invention which is applicable to Volkswagen sedan models of 1954 through 1964. In FIGURES 1 through 5, the clothes and luggage carrier is shown mounted in the head clearance space 10 of the well-known Volkswagen sedan. The head clearance in this vehicle is very generous and permits the use of the compact interior carrier without interfering with the normal comfort and operation of the vehicle and the carrier utilizes storage space which would otherwise be useless.

As shown, the carrier comprises a flat thin approximately rectangular support body 11 or rack which has a marginal frame 12 preferably formed of lightweight metal tubing. The frame 12 is laced longitudinally and transversely with sturdy resilient webbing 13 formed of suitable fabric or plastic. The support body is disposed centrally in the space 10 and its margin is sufficiently close to the curved roof line of the vehicle so that stored articles will not tend to slip from one side of the support body. FIGURE 2 shows a luggage article 14 resting upon the support body 11. Various articles of loose clothing, packages and the like may be supported in the head clearance space 10 by means of the invention.

Figure 1:
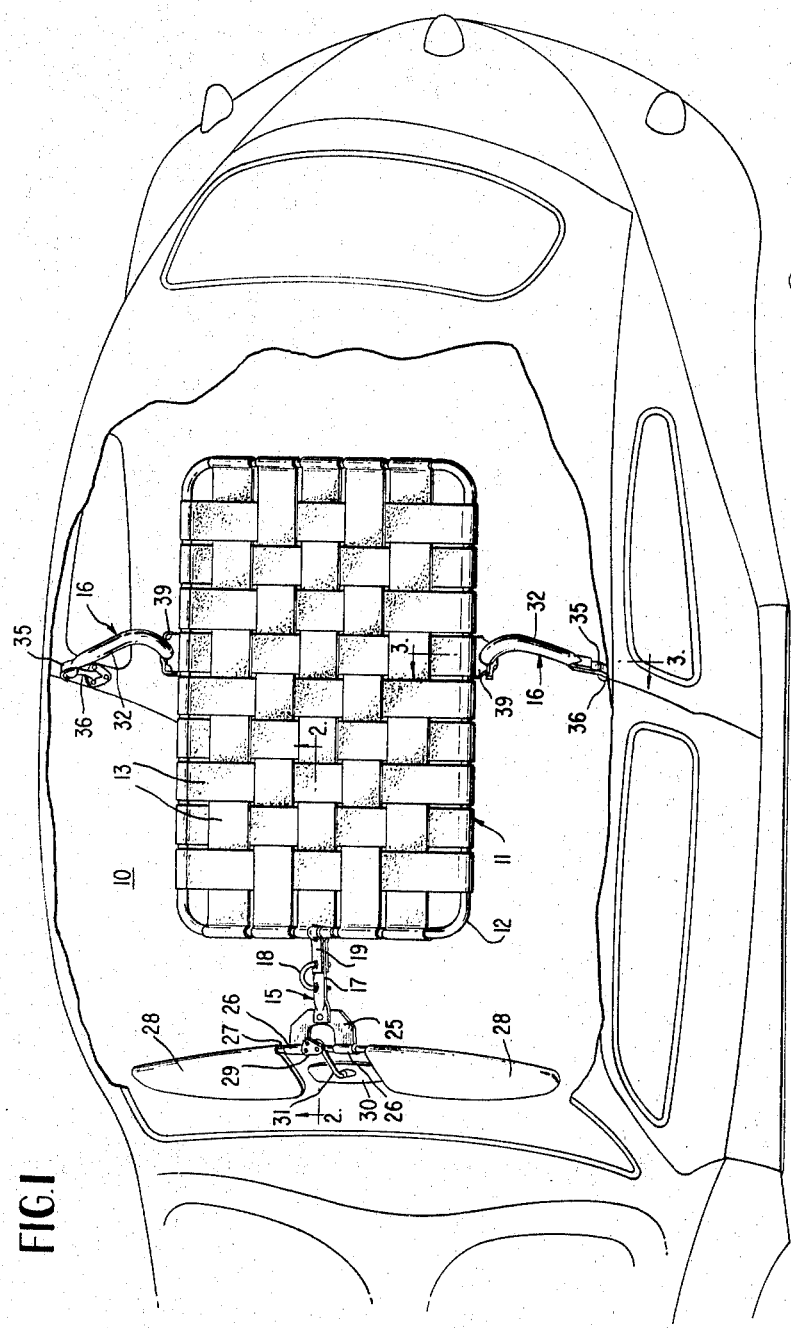
FIGURE 1 is a general plan view, partly in perspective, of a clothes and luggage carrier embodying the invention, in accordance with a preferred form thereof.

The forward end of the frame 12 is supported by a forward arm structure 15 and the opposite sides of the frame are supported by a pair of adjustable arms 16 which are located somewhat rearwardly of the longitudinal center of the support body 11. The forward arm structure 15 comprises a longitudinal arm or bar 17 having its rear end portion secured by one leg of a U-bolt 18 to two clamping bracket sections 19 and 20 whose rear curved knuckles 21 clampingly engage the forward transverse part of tubular frame 12. The knuckles 21 are preferably rigidly secured to the frame 12 by through bolts 22 or the like. A forward flattened extension 23 of the bar 17 is secured by a rivet 24 or the like to a bracket extension 25 having spaced curved knuckles 26 which readily engage over a sturdy round transverse rod 27 which is an existing standard part of the vehicle. As shown in FIGURE 1, the rod 27 mounts the two front sun visors 28 adjacent to the windshield and constitutes a part of the mounting bracket structure 29 for a rear view mirror 30. This particular construction exists on Volkswagen sedans from 1954 through 1964. The rod 27 extends transversely and approximately horizontally near the top of the windshield and forms a stable support for the two curved knuckles 26 which may straddle the rear view mirror arm 31. The forward arm structure 15 is readily separable from the support rod 27 by merely lifting the knuckles 26 free of the rod and no structural modifications or alteration of the existing vehicle hardware is required for installing the invention.

Each side support arm 16 includes a curved arm body 32 having a flattened forward end 33, preferably riveted at 34 to an engaging extension 35 which engages over one of the existing garment hangers 36 on each side of the sedan. The extension 35 is slightly bifurcated as at 37 so as to receive the shank of the hanger 36, FIGURE 3. The arm body 32 has a rear vertical portion 38 which is rotatable within a two-part bearing 39, rigidly secured by bolts 40 to the adjacent side section of the frame 12. The rotatable portion 38 may contain an internal plug 41 of wood or the like tightly held therein, and a flat washer 42 secured to the plug by a screw 43 prevents upward displacement of the portion 38 from its bearing 39. While the two-part bearing 39 permits the arm 16 to be turned relative to the support body 11, in a given adjusted position of the arm, the two-part bearing may clamp the arm portion 38 quite tightly for security. The construction of the opposite side support arm 16 and its engagement with the opposite garment hanger 36 is identical to the arrangement described immediately above and need not be repeated. The three supporting means 15 and 16 are arranged to hold the rack or support body 11 in an approximately level and stable condition within the head clearance space 10.

Smaller articles or packages can be conveniently loaded or unloaded from either side of the support body 11 and larger luggage articles are most conveniently placed on the support body from the unobstructed rear end thereof. As shown in FIGURE 3, the arms 16 rise somewhat above the frame 12 and will engage a suitcase or the like adn prevent the same from shifting laterally while being supported. Also, the webbing 13 will yield downwardly somewhat and tend to cradle the heavier supported articles.

As shown in FIGURE 6, later models of the Volkswagen sedan from 1965 onward have the sun visors 44 supported independently of the rear view mirror support 45. This eliminates the rod 27 and requires the provision of a small transverse adapter rod 46 which may be rigidly attached at 47 by screws or the like to the windshield molding and thus stably supported. The rod 46 extends over the rear view mirror arm 48, as shown, and does not interfere with the mirror. The previously-described supporting knuckles 26 of the forward arm structure 15 engage the rod 46 on opposite sides of the mirror arm in exactly the same manner previously described, and all other parts of the installation remain identical in the later model vehicles.

The entire device is easily removed from the vehicle at any time and may be quickly installed and the support arms may be turned or folded for compact storage. The advantages of the invention should now be readily apparent without the necessity for further description.

One further feature of the invention resides in the use of the U-bolt 18 as an engagement element for the hooks of garment hangers. When the carrier is removed from the vehicle and arranged in a generally vertical plane, the hooks of hangers carrying garments loosely or in suitable bags may be engaged with the U-bolt 18. When the carrier is then placed in the vehicle, the garments will be properly positioned relative to the support body 11.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:
1. An interior article carrier for use in combination with vehicles of the type having garment hanger elements on opposite sides of the interior of the vehicle near the top thereof and head clearance space beneath the roof of the vehicle, comprising a substantially planar support body which is adapted to span a substantial portion of the head clearance space transversely and longitudinally of the vehicle at an elevation above the heads of vehicle occupants, a fixed member in the vehicle near the top of the vehicle windshield, a support arm on the forward end of the support body adapted for supporting engagement with said fixed member, a pair of curved side support arms including substantially upright rotatable portions extending above the opposite sides of the support body to thereby form abutments preventing side displacement of luggage articles on the support body, bearing elements secured to opposite sides of the support body, said bearing elements receiving and supporting the upright rotatable portions for adjustment forwardly and rearwardly by swinging, and said curved side support arms projecting laterally of said support body and adapted for supporting engagement with the garment hanger elements on opposite sides of the vehicle, whereby said article carrier utilizes the head clearance space for storage space.

2. An interior article carrier for use in combination with vehicles of the type having garment hanger elements on opposite sides of the interior of the vehicle near the top thereof and head clearance space beneath the roof of the vehicle, comprising a substantially planar support body having a continuous marginal generally rectangular frame and a somewhat resilient article support panel attached to the frame, said support body adapted to span a substantial portion of the head clearance space transversely and longitudinally of the vehicle at an elevation above the heads of vehicle occupants, a fixed member in the vehicle near the top of the vehicle windshield, a support arm clampingly secured to the forward portion of said frame adapted for supporting engagement with said fixed member, two-part bearing elements, means for attaching the two-part bearing elements to the sides of said marginal frame, and a pair of side support arms clampingly engaged and supported by said two-part bearing elements and projecting laterally of the support body and adapted for supporting engagement with the garment hanger elements on opposite sides of the vehicle, whereby said support body utilizes the head clearance space for storage space.

References Cited

FOREIGN PATENTS 816,323   7/1959   Great Britain.
819,359   10/1951   Germany.

PHILIP GOODMAN, Primary Examiner

U.S. Cl. X.R.

224—42.1